United States Patent
Hatashita et al.

(10) Patent No.: US 9,036,261 B2
(45) Date of Patent: May 19, 2015

(54) OPTICAL ELEMENT, LIGHT DIFFUSING ELEMENT, AND IMAGE DISPLAY APPARATUS

(71) Applicants: Chieko Hatashita, Kanagawa (JP); Takayuki Nakamura, Kanagawa (JP); Hiroshi Nakanuma, Kanagawa (JP); Kentaroh Hagita, Miyagi (JP)

(72) Inventors: Chieko Hatashita, Kanagawa (JP); Takayuki Nakamura, Kanagawa (JP); Hiroshi Nakanuma, Kanagawa (JP); Kentaroh Hagita, Miyagi (JP)

(73) Assignee: Ricoh Company, Ltd., Tokyo (JP)

(*) Notice: Subject to any disclaimer, the term of this patent is extended or adjusted under 35 U.S.C. 154(b) by 87 days.

(21) Appl. No.: 13/972,027

(22) Filed: Aug. 21, 2013

(65) Prior Publication Data

US 2014/0071026 A1    Mar. 13, 2014

(30) Foreign Application Priority Data

Sep. 11, 2012 (JP) .................. 2012-199808

(51) Int. Cl.
*G02B 5/02* (2006.01)
*F21V 5/00* (2006.01)
*G09G 5/10* (2006.01)

(52) U.S. Cl.
CPC *F21V 5/002* (2013.01); *G09G 5/10* (2013.01); *F21V 5/004* (2013.01); *G02B 5/0215* (2013.01); *G02B 5/0221* (2013.01); *G02B 5/0278* (2013.01)

(58) Field of Classification Search
CPC .. G02B 5/0215; G02B 5/0221; G02B 5/0278; G02B 5/02; G02B 5/0205; G02B 5/021; G02B 5/0231; F21V 5/002; F21V 5/004

USPC ......................................................... 359/599
See application file for complete search history.

(56) References Cited

U.S. PATENT DOCUMENTS

| | | | |
|---|---|---|---|
| 8,384,998 B2* | 2/2013 | Taguchi et al. | 359/581 |
| 2007/0159698 A1* | 7/2007 | Taguchi et al. | 359/586 |
| 2009/0067057 A1* | 3/2009 | Sprague et al. | 359/630 |
| 2012/0236380 A1 | 9/2012 | Miyatake et al. | |
| 2013/0070324 A1 | 3/2013 | Hatashita et al. | |
| 2014/0043850 A1* | 2/2014 | Thompson et al. | 362/607 |

FOREIGN PATENT DOCUMENTS

| | | |
|---|---|---|
| JP | 2001-074919 | 3/2001 |
| JP | 2002-234360 | 8/2002 |
| JP | 2007-171857 | 7/2007 |
| JP | 2009-128522 | 6/2009 |
| JP | 2009-205102 | 9/2009 |
| JP | 2009-217278 | 9/2009 |

(Continued)

*Primary Examiner* — Latanya Bibbins
(74) *Attorney, Agent, or Firm* — Oblon, McClelland, Maier & Neustadt, L.L.P.

(57) ABSTRACT

An optical element using visible light from wavelengths $\lambda S$ to $\lambda L$ ($\lambda L > \lambda S$), is formed of a translucent material having refractive indexes $nS$ and $nL$, respectively, for light having the wavelengths $\lambda S$ and $\lambda L$. The optical element includes an incident face; an exit face; and a micro convexo-concave structure used as an anti-reflection structure (ARS), being formed at least one of the incident face and the exit face. An average distance P between adjacent micro convexo-concave structures satisfies condition (1) $P \leq 0.8 \cdot \lambda S/nS$. Dimensionless parameters $mS$ and $mL$ satisfy condition (2) $0.8 \leq mS \leq 1.1$ and condition (3) $0.8 \leq mL \leq 1.1$. The parameters $mS$ and $mL$, an average height $H$, the wavelengths $\lambda S$ and $\lambda L$, and the refractive indexes $nS$ and $nL$ of the micro convexo-concave structure satisfy condition (4) $mS \cdot \lambda S/(2 \cdot nS) \leq H \leq mL \cdot \lambda L/(2 \cdot nL)$.

8 Claims, 7 Drawing Sheets

(56) References Cited

FOREIGN PATENT DOCUMENTS

| | | |
|---|---|---|
| JP | 2010-539525 | 12/2010 |
| JP | 2012-037622 | 2/2012 |
| WO | WO2009/035783 A2 | 3/2009 |

* cited by examiner

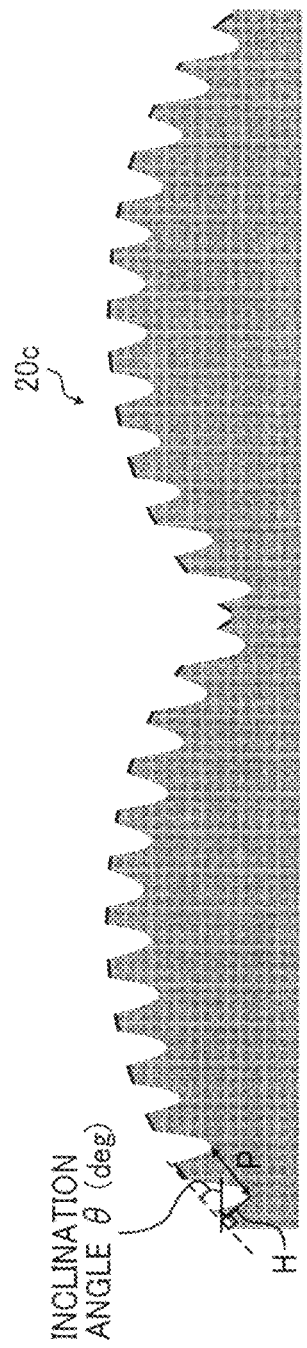

OPTICAL ELEMENT, LIGHT DIFFUSING ELEMENT, AND IMAGE DISPLAY APPARATUS

This application claims priority pursuant to 35 U.S.C. §119 to Japanese Patent Application No. 2012-199808, filed on Sep. 11, 2012 in the Japan Patent Office, the disclosure of which is incorporated by reference herein in its entirety.

BACKGROUND

1. Technical Field

The present invention relates to an optical element, a light diffusing element, and an image display apparatus.

2. Background Art

In general, optical elements are disposed on an optical path of light to cause optical effects such as reflection, refraction, image focusing or the like. Typically, the optical elements are made of translucent material to effect the reflection, refraction, image focusing, and include an incident face at which light enters the optical element and an exit face from which the light exits the optical element. The translucent material used for the optical elements has a refractive index greater than the refractive index of air. Because the refractive index changes discontinuously at the incident face and the exit face, reflection occurs at the incident face and the exit face.

Reflection at the incident and exit faces decreases light-use efficiency of an optical system using the optical elements. To reduce the decrease in light-use efficiency due to reflection, an anti-reflection structure (ARS) can be formed on the incident face and/or the exit face of the optical elements. For example, a dielectric multilayer film has been used as the anti-reflection structures. But a sub-wavelength structure (SWS) as described in JP-2009-128522-A has been also proposed. The SWS is a micro convexo-concave structure having a pitch smaller than a wavelength of light. The optical effect of the SWS depends on the specific shape of the micro convexo-concave structure and the material.

JP-2009-128522-A discloses one SWS having a micro convexo-concave structure and anti-reflection capability, in which the micro convexo-concave structure is such that the pitch of the convexo-concave structure is less than the wavelength of light and the convex portion has a height of 0.4 times or more the wavelength. However, JP-2009-128522-A does not disclose a specific relationship between the optical properties of materials forming the micro convexo-concave structure and the reflection prevention effect.

SUMMARY

In one aspect of the present invention, an optical element is devised. The optical element uses visible light in a wavelength range of from a wavelength $\lambda S$ to a wavelength $\lambda L$. The wavelength $\lambda L$ is greater than the wavelength $\lambda S$ ($\lambda L > \lambda S$). The optical element is formed of a translucent material having a refractive index nS and a refractive index nL respectively for light having the wavelength $\lambda S$ and light having the wavelength $\lambda L$. The optical element includes an incident face; an exit face, at least one of the incident face and the exit face being a flat face; and a micro convexo-concave structure, used as an anti-reflection structure (ARS), being formed at least one of the incident face and the exit face being the flat face. In the micro convexo-concave structure used as the ARS, an average distance P between adjacent micro convexo-concave structures satisfies condition (1), condition (1) $P \leq 0.8 \cdot \lambda S / nS$. Dimensionless parameters mS and mL satisfy conditions (2) and (3), condition (2) $0.8 \leq mS \leq 1.1$, condition (3) $0.8 \leq mL \leq 1.1$. The parameters mS and mL, an average height H, the wavelength $\lambda S$ and the wavelength $\lambda L$, and the refractive index nS and the refractive index nL of the micro convexo-concave structure satisfy condition (4), condition (4) $mS \cdot \lambda S / (2 \cdot nS) \leq H \leq mL \cdot \lambda L / (2 \cdot nL)$.

In another aspect of the present invention, a light diffusing element is devised. The light diffusing element uses visible light in a wavelength range of from a wavelength $\lambda S$ to a wavelength $\lambda L$. The wavelength $\lambda L$ is greater than the wavelength $\lambda S$ ($\lambda L > \lambda S$). The light diffusing element is formed as a parallel plate using a translucent material having a refractive index nS and a refractive index nL respectively for light having the wavelength $\lambda S$ and light having the wavelength $\lambda L$. The light diffusing element includes a light diffusing structure having a small convexo-concavity formed on one face of the parallel plate and a micro convexo-concave structure used as an anti-reflection structure (ARS) formed on at least one face of the light diffusing structure. The light diffusing structure diffuses incident light flux having directivity, entering the light diffusing structure, as diffused light flux having directivity. In the micro convexo-concave structure used as the ARS, an average distance P between adjacent micro convexo-concave structures satisfies condition (1), condition (1) $P \leq 0.8 \cdot \lambda S / nS$. Dimensionless parameters mS and mL satisfy conditions (2) and (3), condition (2) $0.8 \leq mS \leq 1.1$, condition (3) $0.8 \leq mL \leq 1.1$. The parameters mS and mL, an average height H, the wavelength $\lambda S$ and the wavelength $\lambda L$, and the refractive index nS and the refractive index nL of the micro convexo-concave structure satisfy condition (4), condition (4) $mS \cdot \lambda S / (2 \cdot nS) \leq H \leq mL \cdot \lambda L / (2 \cdot nL)$. The small convexo-concavity of the light diffusing structure has an inclination angle $\theta$ having a range of $0 \leq \theta \leq 45$ degrees. The parameters mS and mL satisfy conditions (5) and (6) for one or more inclination angles $\theta k$, changeable within the range of $0 \leq \theta \leq 45$ degrees, condition (5) $mS = 1.1 \times 10^{-4} \cdot \theta k^2 - 4.5 \times 10^{-4} \cdot \theta k + 0.87$, condition (6) $mL = 1.1 \times 10^{-4} \cdot \theta k^2 - 4.5 \times 10^{-4} \cdot \theta k + 0.87$.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 shows a cross-sectional shape of a light diffusing structure configured with microlens arrays;

Figure 1A:
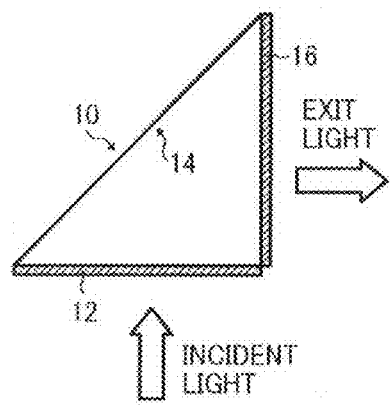
FIGS. 1A, 1B, 1C, 1D, 1E, and 1F schematically show an optical element and a micro convexo-concave structure.

The accompanying drawings are intended to depict exemplary embodiments of the present invention and should not be interpreted to limit the scope thereof. The accompanying drawings are not to be considered as drawn to scale unless

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have a similar function, operate in a similar manner, and achieve a similar result.

Referring now to the drawings, optical elements according to example embodiments are described hereinafter with reference to FIGS. 1 to 8.

In an example embodiment of the present invention, an optical element having following features is devised. An optical element using visible light in a wavelength range of from a wavelength $\lambda S$ to a wavelength $\lambda L$, the wavelength $\lambda L$ being greater than the wavelength $\lambda S$ ($\lambda L > \lambda S$), the optical element being formed of a translucent material having a refractive index $nS$ and a refractive index $nL$ respectively for light having the wavelength $\lambda S$ and light having the wavelength $\lambda L$, the optical element includes an incident face; an exit face, at least one of the incident face and the exit face being a flat face; and a micro convexo-concave structure, used as an anti-reflection structure (ARS), being formed at least one of the incident face and the exit face being the flat face. In the micro convexo-concave structure used as the ARS, an average distance P between adjacent micro convexo-concave structures satisfying condition (1) $P \leq 0.8 \cdot \lambda S/nS$. Dimensionless parameters $mS$ and $mL$ satisfying condition (2) $0.8 \leq mS \leq 1.1$, and condition (3) $0.8 \leq mL \leq 1.1$. The parameters $mS$ and $mL$, an average height $H$, the wavelength $\lambda S$ and the wavelength $\lambda L$, and the refractive index $nS$ and the refractive index $nL$ of the micro convexo-concave structure satisfying condition (4) $mS \cdot \lambda S/(2 \cdot nS) \leq H \leq mL \cdot \lambda L/(2 \cdot nL)$.

Further, in an example embodiment of the present invention, a light diffusing element having following features is devised. A light diffusing element using visible light in a wavelength range of from a wavelength $\lambda S$ to a wavelength $\lambda L$, the wavelength $\lambda L$ being greater than the wavelength $\lambda S$ ($\lambda L > \lambda S$), the light diffusing element being formed as a parallel plate using a translucent material having a refractive index $nS$ and a refractive index $nL$ respectively for light having the wavelength $\lambda S$ and light having the wavelength $\lambda L$. The light diffusing element includes a light diffusing structure having small convexo-concavity formed on one face of the parallel plate and a micro convexo-concave structure used as an anti-reflection structure (ARS) formed on at least one face of the light diffusing structure. The light diffusing structure diffuses incident light flux having directivity, entering the light diffusing structure, as diffused light flux having directivity. In the micro convexo-concave structure used as the ARS, an average distance $P$ between adjacent micro convexo-concave structures satisfying condition (1) $P \leq 0.8 \cdot \lambda S/nS$. Dimensionless parameters $mS$ and $mL$ satisfying condition (2) $0.8 \leq mS \leq 1.1$ and condition (3) $0.8 \leq mL \leq 1.1$. The parameters $mS$ and $mL$, an average height $H$, the wavelength $\lambda S$ and the wavelength $\lambda L$, and the refractive index $nS$ and the refractive index $nL$ of the micro convexo-concave structure satisfying condition (4) $mS \cdot \lambda S/(2 \cdot nS) \leq H \leq mL \cdot \lambda L/(2 \cdot nL)$. The small convexo-concavity of the light diffusing structure has an inclination angle $\theta$ having a range of $0 \leq \theta \leq 45$ degrees. The parameters $mS$ and $mL$ satisfying conditions (5) and condition (6) for one or more inclination angles $\theta k$, changeable within the range of $0 \leq \theta \leq 45$ degrees, condition (5) $mS = 1.1 \times 10^{-4} \cdot \theta k^2 - 4.5 \times 10^{-4} \cdot \theta k + 0.87$, condition (6) $mL = 1.1 \times 10^{-4} \cdot \theta k^2 - 4.5 \times 10^{-4} \cdot \theta k + 0.87$.

A description is now given of an optical element and a light diffusing element according to an example embodiment in detail. At first, a description is now given of one optical element according to an example embodiment. FIG. 1A shows a reflection prism 10, which is an example of optical element according to an example embodiment. Hereinafter, an anti-reflection structure (ARS) is described with reference to FIG. 1A.

As shown in FIG. 1A, the reflection prism 10 is, for example, a right-angle prism having an incident face 12, a reflection face 14, and an exit face 16.

An incident light, entering from the incident face 12, is reflected at the reflection face 14, and then exits from the exit face 16 as an exit light.

A surface structure of the incident face 12 and the exit face 16 of the reflection prism 10 can be formed as a micro convexo-concave structure used as the anti-reflection structure (ARS).

Figure 1B:
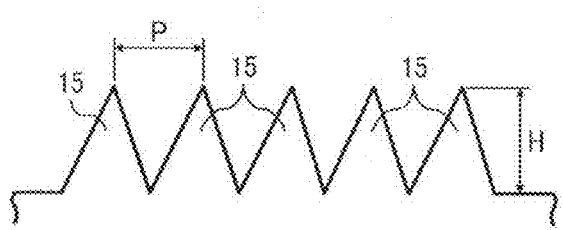

As shown in FIG. 1B, the micro convexo-concave structure such as SWS is composed of an arrangement of a plurality of convex and concave portions in micro scale. FIG. 1B shows an example of micro convexo-concave structure, in which a number of convex portions 15 each having a triangular shape in cross-section are arranged with a periodical or regular pattern.

The arrangement area used for arranging the convex portions 15 becomes a convexo-concave structure. Each of the convex portions 15 may have a given shape such as a cone shape, a pyramid shape, a dome shape, or the like.

In FIG. 1B, the adjacent convex portions 15 have a pitch (hereinafter, distance P) and the height of convex portion 15 is referred to as height H. Further, the refractive index of material of a base member where the convex portion 15 is formed is defined as N0.

The micro convexo-concave structure has a structure that the distance P is smaller than a wavelength of light. In the SWS of FIG. 1B, from the upper end to the lower end of the height H, a space of air existing between the adjacent convex portions 15 continuously decreases. With this configuration, in the up/down direction of FIG. 1B, the refractive index corresponding to the height H area continuously changes from "1" for the air space to "N0" of the material of the base member.

With this configuration, discontinuous change of refractive index does not occur between the air space at both side of the micro convexo-concave structure and the base member, with which the reflection of light can be prevented.

The anti-reflection capability of the SWS varies depending on the above mentioned distance P, height H, refractive index N0, and wavelength 2 of light.

The anti-reflection capability of the SWS can be described as above, but the anti-reflection capability may not require the periodical structure shown in FIG. 1B.

Figure 1C:
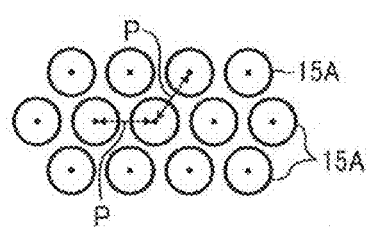

For example, FIG. 1C shows an example arrangement pattern of cone-shaped convex portions 15A arranged regularly, whereas FIG. 1B shows a cross-sectional view of the cone shaped convex portions 15A. In this case, the distance P is a distance between the adjacent convex portions, and may be constant.

Figure 1D:
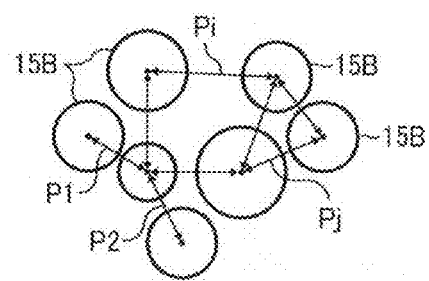

FIG. 1D shows an example arrangement pattern of cone-shaped convex portions 15B having fluctuation in size and arranged randomly or irregularly and also having the anti-reflection capability.

In a case of FIG. 1D, the distance $P_1, P_2, \ldots P_i, P_j \ldots$ for adjacent convex portions 15B is not constant. In this case, the average of distance Pi ($i=1, 2, 3, \ldots$) affects the anti-reflection capability as a parameter. The averaged distance is referred to as the average distance P.

In a case of FIG. 1B, the convex portions are arranged regularly and the distance P is constant, in which the average distance P can be used as the distance P.

An allowable range of fluctuation of the distance Pi, which does not affect the anti-reflection capability, is about ±30% of the average distance P.

Further, the height H of the convex portions is even or uniform height in a case of FIG. 1B, but the height H of the convex portions may not be required as even or uniform height.

Figure 1E:
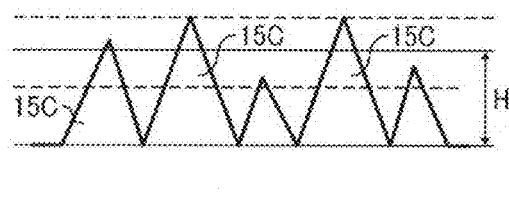

FIG. 1E shows an example arrangement pattern of convex portions 15C, in which the convex portions 15C having randomly-set different heights are arranged.

For example, if the cone-shaped convex portions 15B have different base sizes as shown in FIG. 1D, the height of convex portions 15B may more likely fluctuate randomly as shown in FIG. 1E.

In this case, the height H of the convex portion that effects the anti-reflection capability as a parameter is the average height of the convex portions computed by averaging the height H of the plurality of convex portions. The height H in FIG. 1E indicates the average height H.

Similar to the distance P, when the height H of the convex portion is constant as shown in FIG. 1B, this constant height H can be referred to as the average height H.

Further, in FIG. 1E, the broken lines indicate a fluctuation range of the height H of the convex portions 15C.

An allowable range of fluctuation of the height H, which does not affect the anti-reflection capability, is about ±30% of the average height H.

In cases shown in FIGS. 1B and 1E, each of the convex portions has a top having a sharp edge.

Figure 1F:
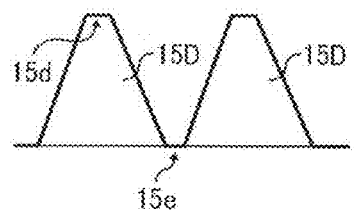

However, the top and base of actually formed convex portion may not be so sharp but may be formed with curved shape, which may not be so sharp. FIG. 1F shows a schematic view of convex portion 15D formed actually having a top 15d and a base 15e, which are shown as a flat face for the simplicity of drawing.

In the above description, the micro convexo-concave structure is described as an arrangement of micro convex portions 15, but the micro convexo-concave structure is not limited hereto. Instead of forming the micro convexo-concave structure by forming the micro convex portions 15 on a surface of a base member having the refractive index N0, cone-shaped micro holes can be formed on a surface of a base member.

In this case, the micro convexo-concave structure can be formed as an arrangement of concave portions of micro holes.

In this case, the average distance P is the average pitch of base of the adjacent micro concave portions, and the average height H is the average depth of micro concave portions.

In this disclosure, the convex portion and the concave portion may not be distinguished but may be referred to collectively as the micro convexo-concave structure, and the average distance P may be referred to as the average distance between adjacent micro convexo-concave structures.

Further, the average height of the convex portion and the average depth of the concave portion may not be distinguished but may be referred to as the average height H of the micro convexo-concave structure.

Further, in a to-be-described later light diffusing element, because the micro convexo-concave structure is formed on a small convexo-concavity structure of the light diffusing element, an inclination angle θ of the micro convexo-concave structure is used as a parameter.

The inclination angle θ is an angle defined by the height direction or the depth direction of each one of convex or concave portion in the micro convexo-concave structure and the surface of the base member, in which the inclination angle θ is, for example, 90 degrees in the above described the micro convexo-concave structure shown in FIG. 1.

If the inclination angle θ is set, an angle that the height direction or the depth direction of each one of one of convex or concave portion in the micro convexo-concave structure formed with respect to the surface of the base becomes "90+θ" degrees or "90-θ" degrees.

The inventors have checked the effect of the above parameters P, H, N0, λ, θ on the anti-reflection capability based on simulation.

In this simulation, three light wavelengths λ1, λ2, and λ3 in the visible range are set by setting λ1=450 nm, λ2=510 nm, and λ3=640 nm. The wavelength λ1 is light emission wavelength of a blue laser light source, the wavelength λ2 is light emission wavelength of a yellow laser light source, and the wavelength λ3 is light emission wavelength of a red laser light source.

These light sources are selected in view of using these light sources as light sources for color image display of an image display apparatus, to be described later.

When the wavelength range from λ1 to λ3 is used for the anti-reflection structure (ARS), the wavelength λ1 corresponds to the above mentioned minimum wavelength λS, and the wavelength λ3 corresponds to the above mentioned maximum wavelength a.

As for the base member having the refractive index N0, optical materials having the refractive indexes of 1.543, 1.537 and 1.530 for the wavelengths λ1, λ2 and λ3 respectively are used.

Hereinafter, it is referred to 1.543=n1, 1.537=n2, 1.530=n3.

The refractive index 1.543 (=n1) corresponds to the above mentioned refractive index nS, and the refractive index 1.530 (=n3) corresponds to the above mentioned refractive index nL.

The micro convexo-concave structure used for the simulation is top-cut cone-shaped convex portions shown in FIG. 1F arranged two-dimensional and regularly (FIG. 1C). The height of the convex portions is assumed to be uniform height corresponding to the average height H.

The inclination angle θ is set 15 degrees, and a width of the top 15*d* of the convex portion is set 20 nm.

Figure 2A:
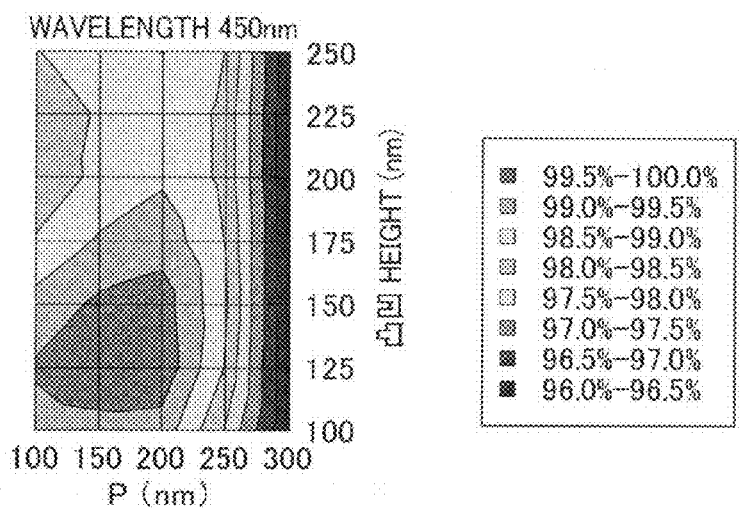
FIGS. 2A, 2B, and 2C show transmittance changes by wavelength in view of the micro convexo-concave structure.
Figure 2B:
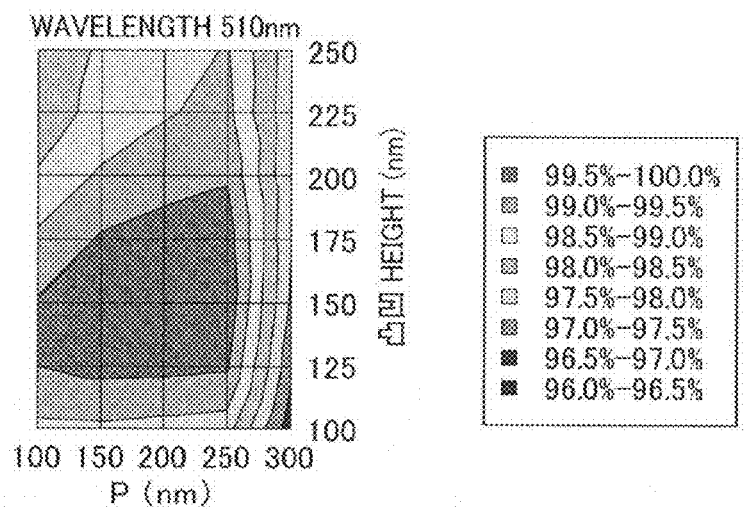
Figure 2C:
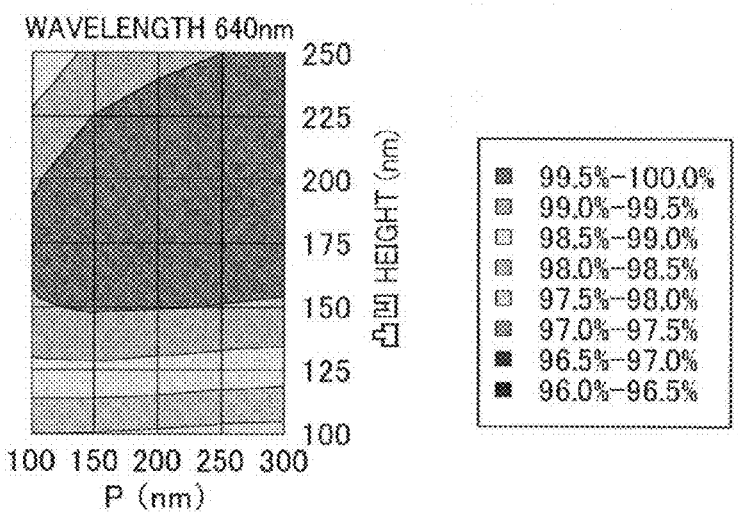

The transmittance change is checked by changing the average distance P and the average height H as parameters of the micro convexo-concave structure. The light emits from the base member toward air. FIGS. 2A, 2B, and 2C show the transmittance change for the wavelengths λ1, λ2 and λ3. The horizontal axis of FIGS. 2A to 2C represents the average distance P, and the vertical axis of FIGS. 2A to 2C represents the average height H. The unit of distance P and height H are nano meter (nm).

The transmittance of 99% or more is set as satisfactory anti-reflection capability. As shown in FIGS. 2A to 2C, to achieve the transmittance of 99% or more for the light of three wavelengths λ1, λ2 and λ3, the average distance P is set 230 nm or less.

Therefore, the average distance P of the micro convexo-concave structure to achieve the transmittance of 99% or more can be determined by the minimum wavelength λS (=λ1).

When a ratio of the wavelength λ and the refractive index n is referred to as a parameter k/n, a relation of the wavelength the refractive index n1, and the average distance P can be defined by the following formula.

$$P \leq 230 \text{ nm} = 0.79 \cdot \lambda 1/n1$$

In view of this relationship, as for the optical element and light diffusing element according to an example embodiment of the present invention, the average distance P of the micro convexo-concave structure is defined to satisfy following condition (1).

$$P \leq 0.8 \cdot \lambda S/nS$$

Further, to check the effect of the average height H (i.e., parameter) of the micro convexo-concave structure to the transmittance, the transmittance change is checked by changing the average height H.

When checking the transmittance change, the average distance P is set to 200 nm that satisfies the condition (1).

Figure 3:
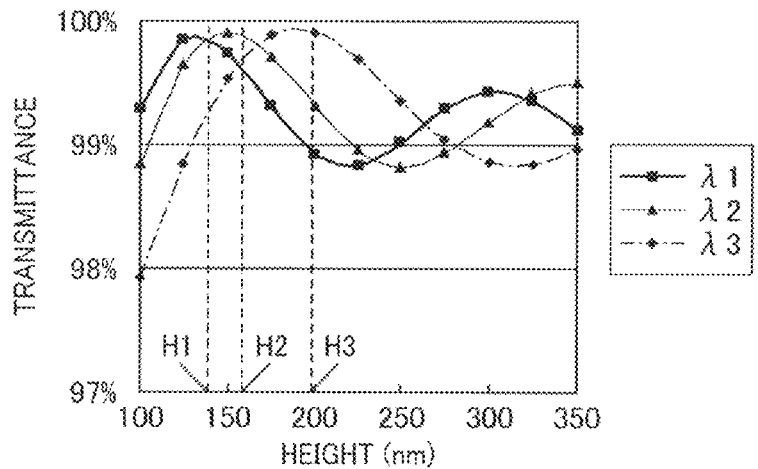
FIG. 3 shows a relationship between average height H of the micro convexo-concave structure and transmittance.

FIG. 3 shows a result of transmittance change when the average height H is changed. When the average height H is changed along the horizontal axis of FIG. 3, the transmittance changes along the vertical axis of FIG. 3 while causing a local maximum and a local minimum.

The average height H that the transmittance becomes the local maximum is referred to as H1, H2 and H3 respectively for the wavelengths λ1, λ2 and λ3.

Based on the refractive index n (i.e., N0) of the base member, the wavelength λ, and the average height H, parameter "m" of dimensionless is introduced by the following formula.

$$m = 2 \cdot n \cdot H/\lambda$$

Based on this formula, parameters m1 to m3 of dimensionless are introduced for the above described refractive indexes n1 to n3, the wavelengths λ1 to λ3, and the average heights H1 to H3 using following formulas.

$$m1 = 2 \cdot n1 \cdot H1/\lambda1,\ m2 = 2 \cdot n2 \cdot H2/\lambda2,\ m3 = 2 \cdot n3 \cdot H3/\lambda3$$

As shown in FIG. 3, the average heights H1 to H3 become as follows.

$$H1 = 130 \text{ nm},\ H2 = 150 \text{ nm},\ H3 = 190 \text{ nm}$$

Based on the values for H1 to H3, and the above described wavelengths λ1 to λ3, refractive indexes n1 to n3, the parameters m1 to m3 can be computed as follows.

$$m1 = 0.89,\ m2 = 0.90,\ m3 = 0.91$$

The transmittance becomes the local maximum when the m1, m2, and m3 take values close to "1" because of following reasons.

The micro structure of the micro convexo-concave structure used in the above described simulation is the regularly arranged convex portions 15D shown in FIG. 1F while setting the constant height for the convex portions 15D.

As for a periodical micro structure of the convex portions 15D, the top 15*d* and the base 15*e* of the convex portion 15D are a flat face, at which the refractive index discontinuously change, and thereby the reflection occurs.

It is assumed that the light passes from the base member to air. Therefore, the above formula "m=2·n·H/λ" is a condition that the phase difference between the light reflected at the top 15*d* and the light reflected at the base 15*e* becomes one-half (½) of wavelength λ.

When this condition is satisfied, the light reflected at the top 15*d* and the light reflected at the base 15*e* can cancel with each other by interference.

As the value of "m" is deviated from the above formula, the transmittance decreases gradually. As shown in FIG. 3, if the average height H is within a range from 130 nm (=Hp to 190 nm (=H3), the transmittance for wavelengths λ1, λ2 and λ3 becomes 99% or more.

In the optical element according to an example embodiment, the average height H of the micro convexo-concave structure used as the anti-reflection structure (ARS) is defined as follows.

With respect to a minimum wavelength λS and a maximum wavelength λL of the use-wavelength range, an allowable range of the average height H is defined as follows by using the average heights HS and HL at which the transmittance is maximal.

$$HS \leq H \leq HL \tag{A}$$

Further, the parameter "m" satisfying "m=2·n·H/λ" for these average heights HS and HL is referred to as parameters mS and mL. When the parameters mS and mL are applied, the above formula (A) becomes as follows.

$$mS \cdot \lambda S/(2 \cdot nS) \leq H \leq mL \cdot \lambda L/(2 \cdot nL) \tag{B}$$

The formula (B) corresponds to the above described condition (4).

In this example case, because HS=H1=130 nm, and HL=H3=190 nm are set, the formula (A) can be set as the following formula (A1).

$$130 \text{ nm} \leq H \leq 190 \text{ nm} \tag{A1}$$

Further, if the parameter "m" is applied, because mS=m1=0.89 and mL=m3=0.91, the following formula (B1) can be obtained.

$$0.89 \cdot \lambda S/(2 \cdot nS) \leq H \leq 0.91 \cdot \lambda L/(2 \cdot nl) \tag{B1}$$

In this case, if the average height H is set, for example, 160 nm, the transmittance of 99% or more can be secured for any wavelengths of λ1 to λ3, and an effective anti-reflection capability can be achieved.

By satisfying the conditions (1) and (4), the anti-reflection capability can be achieved effectively.

A description is given of conditions (2), (3), (5) and (6). In the above example, the surface of the base member is formed with the micro convexo-concave structure used as the anti-reflection structure (ARS), and the surface of the base member has an inclination angle θ of 15 degrees. To confirm the effect of the inclination angle θ to the anti-reflection capability, the inclination angle θ of the micro convexo-concave structure used for the above simulation is changed in a range from 0 degree to 45 degrees, and the change of parameters m1, m2 and m3 is checked.

Figure 4A:
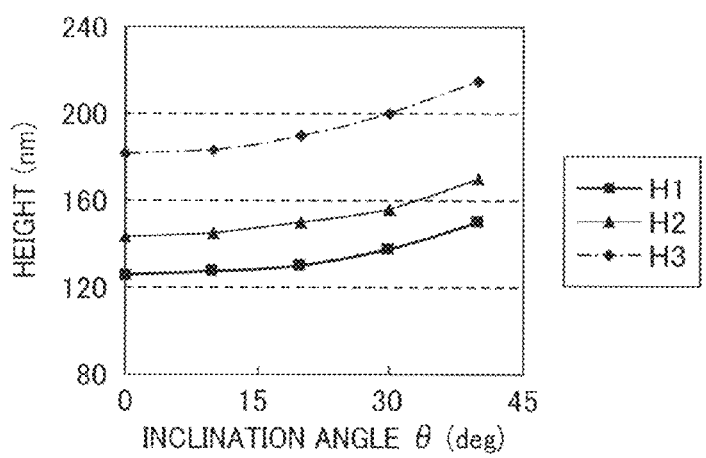
FIGS. 4A and 4B show relationships between average height H, parameter m, and inclination angle.

FIG. 4A shows a relationship of the inclination angle θ and the average height H, in which the horizontal axis represents the inclination angle θ, and the vertical axis represents the average height H. As shown in FIG. 4A, the average height H monotonously increases as the inclination angle θ increases. Each of profiles can be effectively approximately using a quadratic function in view of the shape of each profile.

Figure 4B:
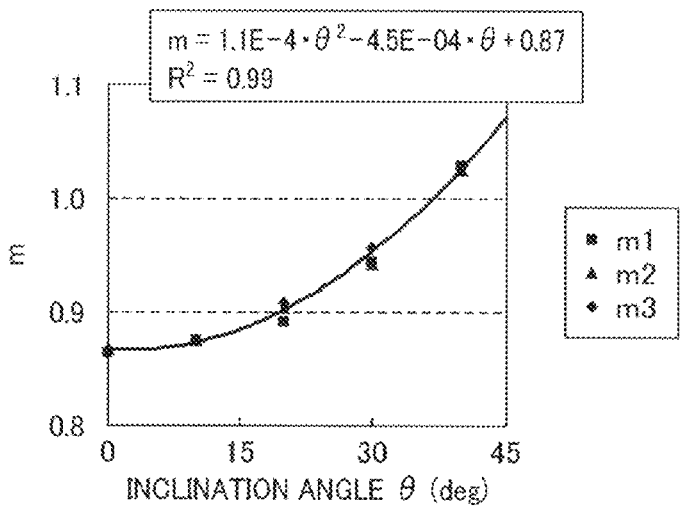

Three profiles shown in FIG. 4A are normalized by wavelength to show a correlation as shown FIG. 4B, in which the horizontal axis represents the inclination angle θ, and the vertical axis represents the parameter m.

As shown in FIG. 4B, the parameter m such as m1, m2, and m3 and the inclination angle θ have a correlation coefficient $R^2=0.99$, and the following quadratic function can be set.

$$m=1.1\times10^{-4}\cdot\theta^2-4.5\times10^{-4}\cdot\theta+0.87 \quad (C)$$

The maximum value of the formula (C) is 1.073 when θ=45 degrees, and the minimum value is 0.87 when θ=0.

The relationship of FIG. 4B is obtained by a simulation computing using 200 nm as the average distance P as described above.

The average distance P can take any values within a range satisfying the condition (1).

In view of the condition (1) that defines the allowable range for the average distance P, the suitable range for the parameters mS and mL is from 0.8 to 1.1.

The range for the parameters mS and mL from 0.8 to 1.1 corresponds to the above described conditions (2) and (3).

Because the optical element according to an example embodiment can satisfy the conditions (1) to (4), the effective anti-reflection capability can be achieved even if the micro convexo-concave structure has the inclination angle θ in the range of 0≤θ≤45 degrees.

In the above described example, mS=m1=0.89, and mL=m3=0.91 are used, and the mS=0.89, and mL=0.91 satisfy the conditions (2) and (3).

These values can be obtained by computing the formula (C) using the inclination angle θ=15 degrees as shown in FIG. 4B.

The value of "m=0.87" when the inclination angle θ=0 satisfies the conditions (2) and (3). Therefore, by forming the micro convexo-concave structure having the inclination angle θ=0 onto the incident face 12 and/or the exit face 16 of the reflection prism 10 shown in FIG. 1A, the incident and exit faces can have the effective anti-reflection capability.

A description is given of a light diffusing element with reference to FIG. 5 and others drawings. The light diffusing element is a parallel plate macroscopically, but a light diffusing structure of small convexo-concavity is formed on one face of the parallel plate.

Further, the anti-reflection structure (ARS) having the micro convexo-concave structure is formed on the light diffusing structure. Further, the ARS of the micro convexo-concave structure can be also formed on a face not having the light diffusing structure.

Hereinafter, the parallel plate viewed macroscopically is referred to as a base plate. The light diffusing element is an example of the optical element using a range of wavelength from λS to λL (>λS) as a use-wavelength range.

The base plate is formed of a translucent material having refractive indexes nS and nL respectively for the light having wavelengths λS and λL.

The light diffusing structure of the light diffusing element can diffuse the incident light flux entering the light diffusing element with directivity as diffused light flux having directivity, which will described later.

Figure 5A:
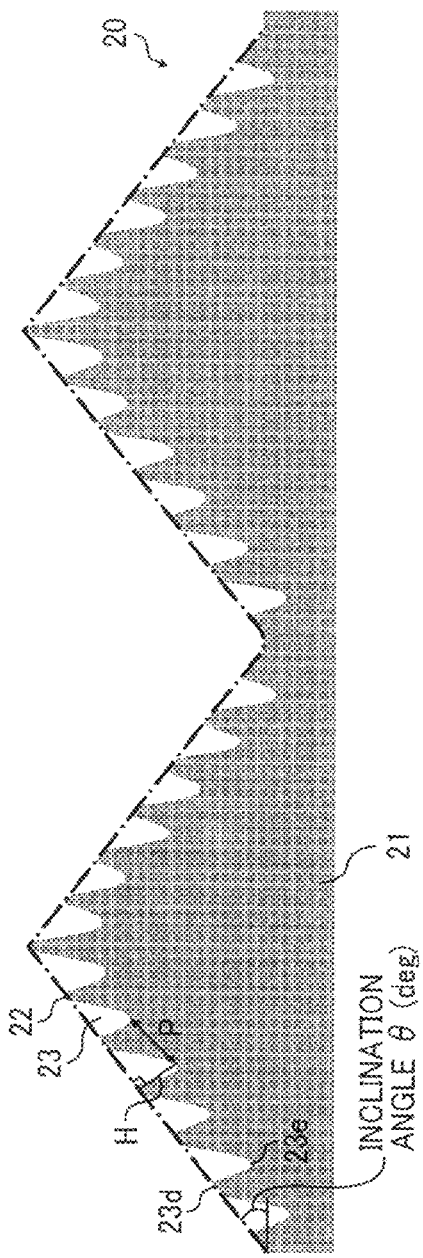
FIGS. 5A, 5B, and 5C show cross-sectional shapes of a light diffusing element.

FIG. 5A shows an example of a cross-sectional shape of the light diffusing element.

The light diffusing structure having a small convexo-concavity structure is formed on one face (e.g., top face) of a base plate 21 of a light diffusing element 20. The cross-sectional shape of the light diffusing structure is indicated by reference number of 22 in FIG. 5A.

As shown in FIG. 5A, the cross-sectional shape 22 of the light diffusing structure is composed of repeated structure of slopes, in which one slope and another slope form a roof as shown in FIG. 5A. The inclination angle of slope corresponds to the above described inclination angle.

The inclination angle is referred to as the inclination angle θ. For example, in the cross-sectional shape 22 of the light diffusing element 20 in FIG. 5A, the inclination angle θ is set to one value. A micro convexo-concave structure 23 is formed on the slope of the light diffusing structure. The convexo-concave structure of the light diffusing structure has a small structure, but the micro convexo-concave structure 23 has a micro structure. Therefore, the micro convexo-concave structure is smaller than the small convexo-concavity structure of the light diffusing structure.

Similar to the above, the micro convexo-concave structure has the height H for convex portions, and the distance P for adjacent convex portions. The height H and distance P respectively correspond to above described average height H and the average distance P. Further, the convex portion has a top 23d and a bottom 23e as a base of convexo-concave structure.

The shape of the light diffusing structure is not limited to FIG. 5A. For example, as shown in FIG. 5B, a light diffusing element 20a having repeated trapezoid cross-sectional shape can be used.

Figure 5C:
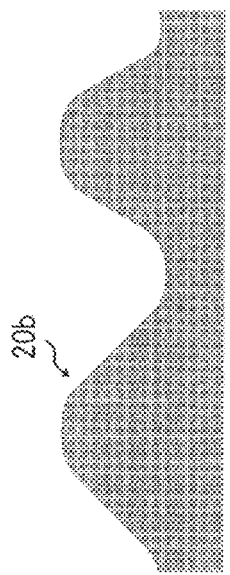
Figure 5B:
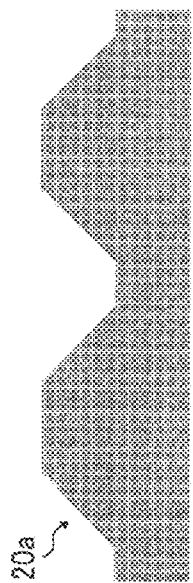

Further, as shown in FIG. 5C, a light diffusing element 20b having a sine wave changing its convexo-concave cross-sectional shape smoothly can be used.

As one example, in the light diffusing element 20 shown in FIG. 5A, a preferable condition for the micro convexo-concave structure when the inclination angle θ=15 degrees is computed.

The above described minimum wavelength λS and maximum wavelength λL for the use wavelength range and refractive indexes nS and nL of the base plate 21 are used.

When the inclination angle θ of 15 degrees is applied for the conditions (5) and (6), mS=mL=0.89 is obtained.

Further, HS and HL become followings using HS=mS·λS/(2·nS) and HL=mL·λL/(2·nL), $HS=139$ nm, $HL=200$ nm Therefore, the average height H of the micro convexo-concave structure is set to satisfy the following condition.

$139\text{nm} \leq H \leq 200$ nm

With this processing, a condition of the micro convexo-concave structure having the effective anti-reflection capability can be obtained.

When the wavelengths λS and λL, the refractive indexes nS and nL, and the inclination angle θ (0≤θ≤45 degrees) are given, the average height H is set to satisfy the following condition.

$$mS \cdot \lambda S/(2 \cdot nS) \leq H \leq mL \cdot \lambda L/(2 \cdot nL), \text{ and}$$

$$mS = 1.1 \times 10^{-4} \cdot \theta^2 - 4.5 \times 10^{-4} \cdot \theta + 0.87 \quad (5)$$

$$mL = 1.1 \times 10^{-4} \cdot \theta^2 - 4.5 \times 10^{-4} \cdot \theta + 0.87 \quad (6)$$

In this case, the above conditions (1) to (3) are required to be satisfied.

With this processing, as for the plurality of wavelengths λ1, λ2 and λ3 corresponding to a plurality of light sources, and the light diffusing structure having any inclination angle θ, the average height H of the micro convexo-concave structure can be set suitably.

Another example embodiment is given as follows. Optical apparatuses having optical elements such as prisms and light diffusing elements may employ laser light sources as the light source, and semiconductor laser light sources are used widely.

The oscillation wavelength of the semiconductor laser may fluctuate due to environmental change such as temperature change.

As for the fluctuation of oscillation wavelength, the micro convexo-concave structure of optical element and the light diffusing element can devise an effective anti-reflection capability, and a description is given of conditions for the effective anti-reflection capability.

As an example of the light diffusing element, the light diffusing element 20 shown in FIG. 5A having the inclination angle θ=15 degrees is assumed, and a width of the top 23d of the micro convexo-concave structure is set, for example, 20 nm.

The wavelength of light may fluctuate within ±20 nm of 510 nm used as a reference wavelength.

In this case, the use-wavelength range for the light diffusing element is from λS=490 to λL=530.

The refractive index of material of light diffusing element is 1.539 for the wavelength λS (=490 nm), 1.537 for the wavelength of 510 nm, and 1.536 for the wavelength λL (=530 nm).

When θ=15 degrees is input to the conditions (5) and (6), mS and mL are obtained as follows. mS=mL=0.89.

Using the value of mS=mL=0.89, the wavelength λS (=490 nm) and wavelength λL (=530 nm), the refractive index nS (=1.539) and refractive index nL (=1.536), the average heights HS and HL can be obtained.

The average heights HS and HL are obtained as follows.

$$HS = mS \cdot \lambda S/(2 \cdot nS) = 142 \text{ nm}$$

$$HL = mL \cdot \lambda L/(2 \cdot nL) = 154 \text{ nm}.$$

Therefore, the average height H of the micro convexo-concave structure is set, for example, within a range of 142 nm≤H≤154 nm.

In a typical case, when the use-wavelength range from λS to λL, the refractive index range of material from nS to nL, and the inclination angle θ (0≤θ≤45 degrees) are given, in which the average height H is set to satisfy the conditions (1) to (6).

In the above described light diffusing element, the light diffusing element 20 of FIG. 5A is used. In the light diffusing element 20 of FIG. 5A, the light diffusing structure has a plurality of roof-like structures, in which each roof is composed of faces inclined with each other and the inclination angle θ is set to only one angle such as 15 degrees.

In the light diffusing element 20a of FIG. 5B, a flat portion exist between the left and right inclined faces, in which the inclination angle includes an inclination angle of inclined face and an inclination angle (=0) of the flat portion.

Further, in the light diffusing element 20b of FIG. 5C, the inclination angle θ of the light diffusing structure continuously changes.

A light diffusing element 20c shown in FIG. 6 has microlens arrays to form the light diffusing structure, in which convex micro lenses are arranged. In this case, as shown in FIG. 6, the inclination angle θ continuously changes depending on positions on the micro lenses.

When the inclination angle θ cannot be unmistakably set to one angle as described above, in which how to apply the conditions (5) and (6) becomes an issue.

When the inclination angle θ in the conditions (5) and (6) continuously changes, mS and mL continuously change, and HS and HL continuously change depending on the change of the inclination angle θ.

In this case, in theory, the average height H corresponding to a position of the inclination angle θ can be set depending on continuously changing HS, HL changed due to the change of the inclination angle θ.

For example, as for the light diffusing element 20a of FIG. 5B, mS and mL are computed for the inclination angle of two inclined portions using the conditions (5) and (6), and mS and mL are computed the inclination angle (θ=0) for the flat portion using the conditions (5) and (6).

Based on the result of mS and mL, the range of HS and HL is computed, and set a suitable range of the average height H at the inclined portion and flat portion to form the micro convexo-concave structure.

When the inclination angle for the light diffusing structure continuously changes as shown in the light diffusing element 20b of FIG. 5C and the light diffusing element 20c of FIG. 6, the followings is conducted.

For example, one unit of the light diffusing structure is divided into a plurality of areas, and defines the inclination angle of k-th area as θk. Then, as for one or more inclination angles θk, a suitable range of the average height H for the k-th area can be set using parameters mS and mL satisfying the conditions (5) and (6).

Formation of the micro convexo-concave structure for the optical element and the light diffusing element, and formation of the light diffusing structure and the micro convexo-concave structure can be conducted various ways.

As a simple practical method, the optical element and the light diffusing element can be formed of plastic material, in which the resin processing can be used to form the light diffusing structure and the micro convexo-concave structure.

The plastic materials may be thermoplastic resin or thermosetting resin, and the injection molding method can be used to form the above mentioned structures.

Further, the plastic materials may be nanoimprint resin, and the anti-reflection structure (ARS) can be formed by nanoimprint.

Further, the base member of the optical element and the light diffusing element can be formed of optical glass, and the light diffusing structure is formed on the surface of the optical glass, or the light diffusing structure and the anti-reflection structure (ARS) can be formed on the surface of the optical glass.

By using the above mentioned plastic material, the light diffusing structure having the micro convexo-concave structure used as the ARS can be processed as a sheet, and then the sheet is adhered on the base member.

The injection molding method can use thermoplastic resin and thermosetting resin as material resin.

Thermoplastic resin includes, for example, polymethacrylate resin, polycarbonate resin, alicyclic acrylate resin, copolymer cycloolefin, and cycloolefin polymer.

Thermosetting resin includes, for example, epoxy resin, and silicone resin. Melted resin is injected and filled in a cavity of a die having an optical mold setting a diffraction structure, the light diffusing structure by microlens arrays, and micro convexo-concave structure used as the ARS therein.

With this processing, the light diffusing element having the ARS and the light diffusing structure can be manufactured with low cost.

Further, the nanoimprint may include heat nanoimprint, ultraviolet (UV) nanoimprint, and normal temperature nanoimprint.

The nanoimprint resin includes, for example, thermoplastic resin, UV curing resin, HSQ or the like.

The nanoimprint has preferable transfer performance, and further, the nanoimprint for resin material can be conduct a short cycle molding compared to the nanoimprint for glass material.

Therefore, the light diffusing element having preferable anti-reflection capability can be manufactured with low cost.

Further, in the above described method, a conventional secondary processing forming a low reflection layer composed of low refractive index layer and multi-layer film can be omitted.

Therefore, as for a plurality of light source wavelength and light source wavelength causing wavelength fluctuation, and the greater inclination angle of diffused face, the light diffusing element having an effective anti-reflection capability can be devised with low cost.

Therefore, the above described light diffusing element can be applied to color image display apparatus without degrading color balance, and further, a greater screen, high luminance, low power consumption, and low cost can be achieved.

The above described light diffusing element can be applied to various image display apparatuses which require light diffusion into a desired direction.

A description is given of a head-up display (HUD) used as an image display apparatus.

The HUD can be disposed in, for example, automobiles, trains, ships, helicopters, airplanes, game machines, medical apparatuses or the like.

Because the HUD can display various information, such as speed, navigation display, alert or the like on a field of vision of an operator, the operator can check the information without switching the field of vision.

Figure 7A:
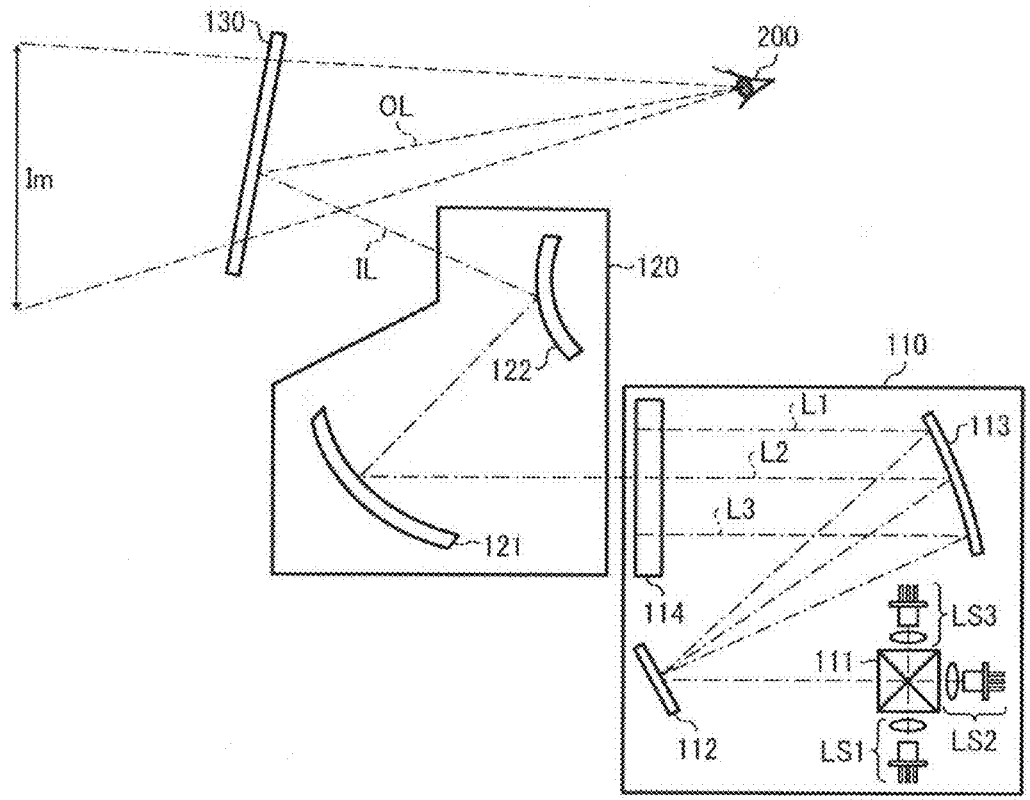
FIGS. 7A and 7B schematically show a head-up display (HUD)

FIG. 7A shows a schematic configuration of the HUD. The HUD, which can display color image, includes, for example, a light flux generator 110, a light flux controller 120, and a semi-translucent mirror 130. The light flux generator 110 includes, for example, three light sources LS1, LS2, LS3, a beam synthesizing prism 111, an oscillation mirror 112, a concave mirror 113, and a light diffusing element 114.

Each of the light sources LS1, LS2 and LS3 is, for example, a semiconductor laser light source, which includes a semiconductor laser and a collimator lens.

The semiconductor laser light source sets light fluxes emitted from the semiconductor laser as parallel light flux using a collimator lens.

The diameter of parallel light flux is, for example, 0.1 mm or so.

The semiconductor laser of the light sources LS1, LS2 and LS3 respectively emit laser beams, for example, having the above mentioned wavelength $\lambda 1$=450 nm (blue), $\lambda 2$=510 nm (yellow), and $\lambda 3$=640 nm (red).

Color image can be displayed using these three primary color laser beams.

Laser beams emitted from the light sources LS1, LS2 and LS3 can be synthesized as one beam using the beam synthesizing prism 111 having a dichroic filter.

The synthesized beam is reflected by the oscillation mirror 112. The oscillation mirror 112 scans the reflection beam two-dimensionally using two-dimensional oscillation.

The oscillation mirror 112 is a horizontal/vertical scanning mirror, which can be manufactured as an integrated compact mirror using the micro electro mechanical system (MEMS) technologies.

The scanned reflection beam is reflected by the concave mirror 113.

The concave mirror 113 reflects the direction of reflection beams to one direction. In FIG. 7A, beams are reflected by the concave mirror 113 as L1, L2, L3.

The beams L1, L2 and L3 indicate that the same beam is shifted in parallel by two-dimensional scanning. While two-dimensionally shifted in parallel, the beams reflected by the concave mirror 113 enter the light diffusing element 114. The beam entering the light diffusing element 114 is referred to as scanning beam.

The light emission intensity of each of the semiconductor lasers of the light sources LS1, LS2 and LS3 is modulated by image signals, and the light diffusing element 114 is two-dimensionally scanned by scanning beams shifted in parallel.

With this two-dimensional scanning, a color image is formed on the light diffusing element 114. This color image is a two-dimensional original image, which is a target of observation.

Figure 7B:
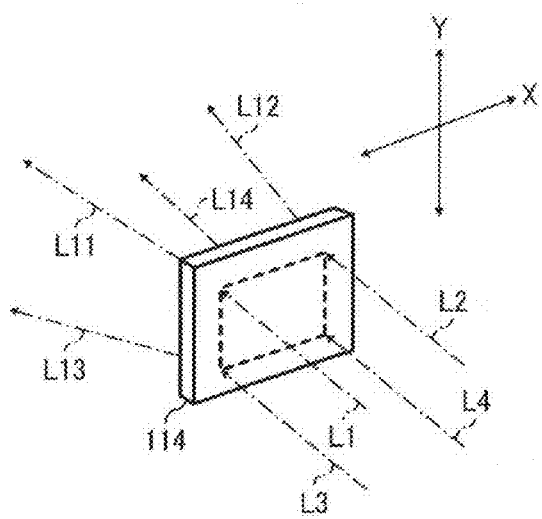

As shown in FIG. 7B, the light diffusing element 114 converts scanning beams L1 to L4 entering the incident face from a perpendicular direction to beams L11 to L14 having desired divergence angles.

As shown in FIG. 7B, a case that parallel light flux having a rectangle cross-sectional shape enters the light diffusing element 114 by setting the X and Y directions is considered.

As for the light flux having the rectangle cross-sectional shape, two sides are parallel to the X direction, and other two sides are parallel to the Y direction.

If the exiting light flux exits in the X direction with an angle $\alpha$, and exits in the Y direction with an angle $\beta$, the angle $\alpha$ is referred to as divergence angle in X direction, and the angle $\beta$ is referred to as divergence angle in Y direction.

The beams L11 to L14 diffused by the light diffusing element 114 is referred to as diffused beam, wherein the beams L11 to L14 comes from the same scanning beam and changed by two-dimensional scanning.

The diffused beam has a given diffused condition and directivity.

The diffused beams diffused by the light diffusing element 114 enter the light flux controller 120. The light flux controller 120 includes, for example, a concave mirror 121 and a convex mirror 122.

The concave mirror 121 and the convex mirror 122 configure an image enlarging optical system, and focus an enlarged image of the above two-dimensional original image as an object on the light diffusing element 114.

The beam exiting from the light flux controller 120 is referred to as a focusing beam IL as shown in FIG. 7A.

The above enlarged image is configured by two-dimensional scanning of the focusing beam IL.

The focusing beam IL exiting from the light flux controller 120 enters the semi-translucent mirror 130, in which a part of light is reflected, and other remaining light passes.

The beam reflected by the semi-translucent mirror 130 is referred to as an observation beam OL, and the observation beam OL enters eye 200 of an observer such as a user.

The observer can see an image Im generated by two-dimensional scanning of the observation beam OL with the eye 200.

The image Im is a virtual image. A part of the focusing beam IL passing the semi-translucent mirror 130 generates an actual image in a space in front of the observer. However, because the beam generating the actual image is not directed to the observer, the observer does not observe this actual image.

The observer can see the virtual image Im as an image in a space.

For example, the light flux generator 110 and the light flux controller 120 are integrated and installed above an instruments panel of an automobile, and a windshield is set with a given reflection rate to use as the semi-translucent mirror 130.

Then, for example, information such as speedometer is generated in the space in front of the windshield as the virtual image Im, with which a driver can observe the virtual image Im while seeing the windshield in front of the driver.

In this situation, the driver does not need switch a field of vision, with which driving safety can be enhanced.

Further, because the focusing beam IL is diffused by the light diffusing element 114, the focusing beam IL can irradiate a greater area near the eye of the observer.

Therefore, even if the observer moves the eyes a little, the virtual image 1m can be seen by the eyes securely. The diffusing effect by the light diffusing element 114 corresponds to an enlargement of exit pupil.

The above HUD includes, for example, one or more light sources LS1 to LS3 which emit light of visible range in a wavelength range from $\lambda S$ to $\lambda L$ ($>\lambda S$).

The light flux such as laser beams emitted from the light sources can be synthesized as one beam by the beam synthesizing prism 111.

Then, the beam is two-dimensionally scanned by the oscillation mirror 112, then directed to a given direction by the concave mirror 113, and is used to generate the original image on the light diffusing element 114.

In this configuration, the beam synthesizing prism 111, the oscillation mirror 112 and the concave mirror 113 can be configured as a main unit of an original image generator that generates the two-dimensional original image using light flux having directivity.

Then, the light diffusing element 114 diffuses the light flux coming from the original image generator as diffused light flux having directivity.

The concave mirror 121 and the convex mirror 122 in the light flux controller 120 can be used as a focusing optical system. The diffused light flux enters the focusing optical system, and then the focusing optical system focuses the enlarged image of the two-dimensional original image.

The semi-translucent mirror 130 is disposed on an optical path between the focusing optical system and the enlarged image, and reflects the focusing light flux to the observer.

Further, the light sources LS1 to LS3 are, for example, semiconductor laser light sources, which can emit light of three wavelengths $\lambda 1$, $\lambda 2$ and $\lambda 3$ that can generate a color image. The light diffusing element 114 is, for example a parallel plate macroscopically, in which one face of light diffusing element 114 is formed with the light diffusing structure having a small convexo-concavity structure, and further, the micro convexo-concave structure used as the anti-reflection structure (ARS) can be formed on the light diffusing structure.

The light diffusing element 114 is provided with the light diffusing structure having microlens arrays for diffraction structure, and is controlled to have a given divergence angle.

The light diffusing structure can be configured with various configurations as described above. A description is given of examples of light diffusing structure with reference to FIG. 8.

Figure 8A:
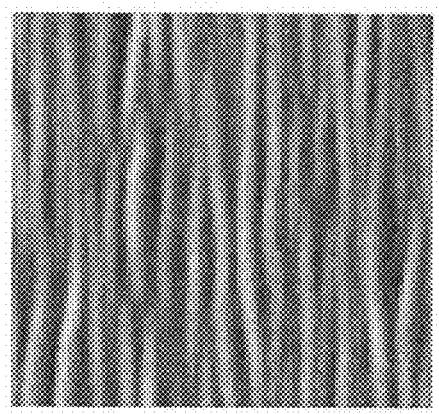
FIGS. 8A, 8B, and 8C show light diffusing structures of a light diffusing element.

FIG. 8A shows the light diffusing structure using diffraction structure. The diffraction structure has a configuration arranging stripe patterns in a short side direction along the long side direction. This configuration is employed so that a observer can see the displayed information when the observer sees a displayed image from an oblique direction from the left and right, wherein a greater viewing angle is required in the left and right direction compared to the up and down direction. Therefore, a greater divergence angle such as non-uniform diffusion is required for the long side direction (X direction) compared to the short side direction (Y direction).

Instead of the non-uniform diffusion, the same divergence angle can be set for the long side direction and the short side direction (i.e., uniform diffusion), in which the face is used as a rough face.

Figure 8B:
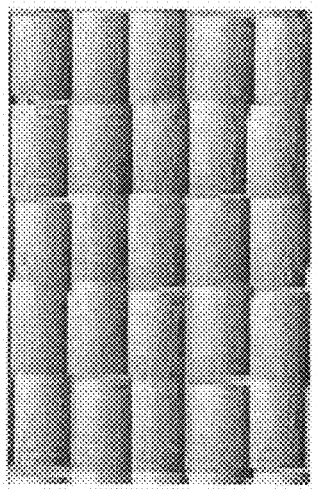
Figure 8C:
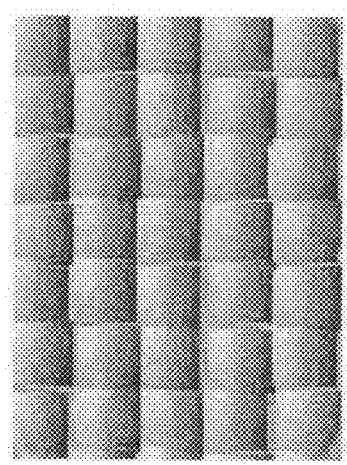

FIGS. 8B and 8C show the light diffusing structures using microlens arrays. The light diffusing structure of FIG. 8B has a greater divergence angle in the X direction compared to the light diffusing structure of FIG. 8C.

As described above, the light diffusing element has the light diffusing structure and the anti-reflection structure (ARS). By disposing the ARS, an enhanced reflection prevention effect can be achieved.

For example, when the above image display apparatus conducts a color image display, the reflection prevention effect at the light diffusing element becomes effective for each of red, green, and blue lights evenly and strongly.

Therefore, the color balance deterioration due to strong light intensity for one color and weak light intensity for other color among red, green and blue light having respective wavelength can be effectively prevented, with which a natural image or natural-like image can be seen.

Further, when the display image is to be enlarged, the divergence angle of the light diffusing element is required to be greater, and the inclination angle of the diffusing face becomes greater. As for the above light diffusing element according to an example embodiment, even if the inclination angle of the diffusing face becomes greater, an effective anti-reflection capability can be achieved.

Therefore, the above described light diffusing element can be applied to the image display apparatus, with which a greater screen, high luminance, and low power consumption can be achieved without degrading color balance.

Further, the image enlarging optical system in the light flux controller 120 shown in FIG. 7 can be replaced with other known image enlarging optical systems.

Further, although the light diffusing structure is configured using the convex microlens arrays, the light diffusing structure can be configured using negative microlens arrays.

In the above simulation for the anti-reflection structure (ARS), the average height H having a constant value and the average distance P having a constant value are used.

However, the average height H and the average distance P may not be required to be constant. For example, when the ARS is manufactured using uneven height and/or distance, similar to the above example using even height and/or distance, an effective anti-reflection capability is obtained by satisfying the conditions (1) to (6).

When the sub-wavelength structure is used as the anti-reflection structure, a good level of anti-reflection capability is required for a use-wavelength range. In an example embodiment, an optical element having good level of anti-reflection capability for desired use-wavelength range in visible range can be devised.

As for the above described optical element, a material of element, refractive index of air, a shape of micro convexo-concave structure, a minimum wavelength and a maximum wavelength of the use-wavelength range can satisfy the conditions (1) to (4), with which an effective anti-reflection capability can be achieved.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An optical element using visible light of a wavelength range of from a wavelength $\lambda S$ to a wavelength $\lambda L$, the wavelength $\lambda L$ being greater than the wavelength $\lambda S$ ($\lambda L > \lambda S$), the optical element being formed of a translucent material having a refractive index nS and a refractive index nL, respectively, for light having the wavelength $\lambda S$ and light having the wavelength $\lambda L$, the optical element comprising:
an incident face;
an exit face;
at least one of the incident face and the exit face being a flat face; and
a plurality of micro convexo-concave structures, used as an anti-reflection structure (ARS), formed on at least the flat face,
an average distance P between adjacent micro convexo-concave structures satisfying condition (1), $$P \leq 0.8 \cdot \lambda S/nS, \quad \text{condition (1)}$$

dimensionless parameters mS and mL satisfying condition (2) and condition (3), $$0.8 \leq mS \leq 1.1 \quad \text{condition (2)}$$

$$0.8 \leq mL \leq 1.1, \quad \text{condition (3)}$$

the parameters mS and mL, an average height H, the wavelength $\lambda S$ and the wavelength $\lambda L$, and the refractive index nS and the refractive index nL of the micro convexo-concave structure satisfying condition (4), $$mS \cdot \lambda S/(2 \cdot nS) \leq H \leq mL \cdot \lambda L/(2 \cdot nL). \quad \text{condition (4)}$$

2. A light diffusing element using visible light in a wavelength range of from a wavelength $\lambda S$ to a wavelength $\lambda L$, the wavelength $\lambda L$ being greater than the wavelength $\lambda S$ ($\lambda L > \lambda S$), the light diffusing element being formed as a parallel plate using a translucent material having a refractive index nS and a refractive index nL, respectively, for light having the wavelength $\lambda S$ and light having the wavelength $\lambda L$, the light diffusing element comprising:
a light diffusing structure having a small convexo-concavity formed on one face of the parallel plate; and
a plurality of micro convexo-concave structures used as an anti-reflection structure (ARS) formed on at least one face of the light diffusing structure,
wherein the light diffusing structure diffuses incident light flux having directivity, entering the light diffusing structure, as diffused light flux having directivity,
an average distance P between adjacent micro convexo-concave structures satisfying condition (1), $$P \leq 0.8 \cdot \lambda S/nS, \quad \text{condition (1)}$$

dimensionless parameters mS and mL satisfying condition (2) and condition (3), $$0.8 \leq mS \leq 1.1 \quad \text{condition (2)}$$

$$0.8 \leq mL \leq 1.1, \quad \text{condition (3)}$$

the parameters mS and mL, an average height H, the wavelength $\lambda S$ and the wavelength $\lambda L$, and the refractive index nS and the refractive index nL of the micro convexo-concave structure satisfying $$mS \cdot \lambda S/(2 \cdot nS) \leq H \leq mL \cdot \lambda L/(2 \cdot nL), \quad \text{condition (4)}$$

wherein the small convexo-concavity of the light diffusing structure has an inclination angle $\theta$ of between 0 and 45 degrees inclusive ($0 \leq \theta \leq 45$ degrees),
the parameters mS and mL satisfying condition (5) and condition (6) for one or more inclination angles $\theta k$, changeable within a range of $0 \leq \theta \leq 45$ degrees, $$mS = 1.1 \times 10^{-4} \cdot \theta k^2 - 4.5 \times 10^{-4} \cdot \theta k + 0.87 \quad \text{condition (5)}$$

$$mL = 1.1 \times 10^{-4} \cdot \theta k^2 - 4.5 \times 10^{-4} \cdot \theta k + 0.87. \quad \text{condition (6)}$$

3. The light diffusing element of claim 2, wherein the light diffusing structure comprise microlens arrays.

4. The light diffusing element of claim 2, wherein the light diffusing structures and the micro convexo-concave structure are made of plastic material.

5. An image display apparatus, comprising:
one or more light sources emitting visible light in a wavelength range of from a wavelength $\lambda S$ to a wavelength $\lambda L$, the wavelength $\lambda L$ being greater than the wavelength $\lambda S$ ($\lambda L > \lambda S$);
an original image generator to generate a two-dimensional original image using a light flux having directivity coming from the one or more light sources;
the light diffusing element of claim 2, to diffuse the light flux coming from the original image generator as a diffused light flux having directivity;
a focusing optical system that the diffused light flux enters, to focus an enlarged image of the two-dimensional original image; and
a reflector, disposed on an optical path between the focusing optical system and the enlarged image, to reflect a focus light flux to an observer.

6. The image display apparatus of claim 5, wherein the one or more light sources comprise a semiconductor laser light source.

7. The image display apparatus of claim 6, wherein the one or more light sources comprise three semiconductor laser light sources, each emitting light of three wavelength of $\lambda 2$ and $\lambda 3$ that can generate a color image, and the wavelength of $\lambda S$, $\lambda 1$, $\lambda 2$, $\lambda 3$, and $\lambda L$ satisfying a relationship of condition (7) $\lambda S \leq \lambda 1 < \lambda 2 < \lambda 3 \leq \lambda L$.

8. The image display apparatus of claim 6, wherein an oscillation wavelength $\lambda$, of the one or more light sources varies in a range of $\lambda S < \lambda < \lambda L$.

* * * * *